United States Patent [19]

King, Jr. et al.

[11] Patent Number: 5,504,177
[45] Date of Patent: Apr. 2, 1996

[54] METHOD FOR PREPARATION OF BLOCK COPOLYSILOXANECARBONATES

[75] Inventors: Joseph A. King, Jr., Niskayuna; Patrick J. McCloskey, Watervliet; Gary C. Davis, Albany, all of N.Y.

[73] Assignee: General Electric Company, Schenectady, N.Y.

[21] Appl. No.: 397,456

[22] Filed: Mar. 2, 1995

[51] Int. Cl.⁶ .................................................. C08G 77/08
[52] U.S. Cl. .............................. 528/29; 528/14; 528/21; 528/41
[58] Field of Search .................. 528/26, 29; 528/41, 528/14, 21

[56] References Cited

U.S. PATENT DOCUMENTS

| | | | |
|---|---|---|---|
| 3,419,634 | 12/1968 | Vaughn, Jr. | 528/26 |
| 3,419,635 | 12/1968 | Vaughn, Jr. | 528/25 |
| 4,945,148 | 7/1990 | Rich et al. | 528/26 |
| 5,039,772 | 8/1991 | Davis et al. | 528/15 |
| 5,214,118 | 5/1993 | Hawkins | 528/26 |
| 5,243,009 | 7/1993 | Rich et al. | 528/26 |
| 5,273,685 | 12/1993 | Takata et al. | 252/511 |

Primary Examiner—Ralph H. Dean
Attorney, Agent, or Firm—William H. Pittman

[57] ABSTRACT

Copolysiloxanecarbonates are prepared in the melt by the reaction of a diaryl carbonate such as diphenyl carbonate with a mixture of a dihydroxyaromatic compound and a carbonate-terminated polydiorganosiloxane, the latter typically prepared by reaction of a diaryl carbonate or aryl chloroformate with a hydroxyorgano-terminated polydiorganosiloxane. By this method, incorporation of silicone units in the copolysiloxanecarbonate is maximized.

18 Claims, No Drawings

1

METHOD FOR PREPARATION OF BLOCK COPOLYSILOXANECARBONATES

BACKGROUND OF THE INVENTION

This invention relates to the preparation of block copolysiloxanecarbonates, and more particularly to their preparation by an improved transesterification method.

The preparation of polycarbonates is typically by one of two methods: the interfacial and the transesterification or melt method. The interfacial method comprises the reaction of at least one dihydroxy compound, generally a dihydroxyaromatic compound, with phosgene in a mixed aqueous-organic (e.g., methylene chloride) medium, in the presence of a basic reagent as acid acceptor and an amine as catalyst.

By reason of the high toxicity of phosgene and the environmental unsuitability of solvents such as methylene chloride, the transesterification or melt method for polycarbonate production is becoming more common. In this method, the dihydroxy compound undergoes reaction in the melt with a diaryl carbonate such as diphenyl carbonate. Initial stages are conducted at temperatures typically up to about 200° C. to produce oligomeric polycarbonate, and the molecular weight is then built by heating at temperatures on the order of 300° C.

Block copolysiloxanecarbonates are used in place of polycarbonates for certain applications, particularly those in which flame retardancy or hydrolytic stability is required and relatively low temperatures of use are intended. A method for their preparation, described in U.S. Pat. No. 3,419,634, comprises the hydrosilylation of an ethylenically unsaturated organic hydroxy compound such as 2-allylphenol with a polydiorganosiloxane containing Si—H moieties, preferably on the terminal silicon atoms, to form a hydroxyorgano-terminated polydiorganosiloxane, and the phosgenation of a mixture of said polydiorganosiloxane and a dihydroxyaromatic compound such as 2,2-bis(4-hydroxyphenyl)propane or "bisphenol A".

The use of a melt procedure for preparation of the copolysiloxanecarbonate is also mentioned in said patent. However, it would not be generally expected that a melt procedure would be suitable since polydiorganosiloxanes usually decompose when heated to the high temperatures required for melt polycarbonate preparation.

In fact, it has been discovered that only low incorporation of polydiorganosiloxane blocks into the polycarbonate is achieved by reaction of diaryl carbonate with a mixture of a dihydroxyaromatic compound and a hydroxyorgano-terminated silicone. This is demonstrated by the fact that a two-phase system is formed upon dissolution of the product in chloroform, the lower phase being predominantly polycarbonate and the upper predominantly polydiorganosiloxane.

There is also a tendency with melt preparation to the formation of copolymers (to the extent they are formed at all) having very high molecular weight polydiorganosiloxane blocks, as a result of incorporation of several such blocks at a single point in the polymer. This can cause haziness in the product, as opposed to a more random distribution of the polydiorganosiloxane blocks which results in the formation of a transparent polymer.

The present invention is based on the discovery of an improved method for preparation block copolysiloxanecarbonates in a melt procedure. Among the advantages which may be observed upon performance of this method are increased incorporation of polydiorganosiloxane and increased randomness of the distribution of the polydiorganosiloxane blocks in the product.

SUMMARY OF THE INVENTION

The invention is a method for preparing a block copolysiloxanecarbonate which comprises heating in the melt in the presence of a carbonate transesterification catalyst, at temperatures increasing to a final value of at least about 280° C., a mixture of at least one dihydroxyaromatic compound, at least one carbonate-terminated polydiorganosiloxane free from Si—O—C linkages and at least one diaryl carbonate.

DETAILED DESCRIPTION; PREFERRED EMBODIMENTS

The dihydroxyaromatic compounds employed in the method of this invention typically have the formula HO—$R^1$—OH, wherein each $R^1$ independently is a divalent aromatic organic radical. Suitable $R^1$ values include m-phenylene, p-phenylene, 4,4'-biphenylene, 2,2-bis(4-phenylene)propane and similar radicals such as those which correspond to the aromatic dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

$R^1$ preferably has the formula —$A^1$—Y—$A^2$—, wherein each of $A^1$ and $A^2$ is a monocyclic divalent aromatic radical and Y is a bridging radical in which one or two atoms separate $A^1$ from $A^2$. The free valence bonds in the latter formula are usually in the meta or para positions of $A^1$ and $A^2$ in relation to Y. Compounds in which $R^1$ has said formula are bisphenols, and the word "bisphenol" will frequently be used hereinafter to designate the dihydroxyaromatic compound. However, it should be understood that other dihydroxyaromatic compounds may be used.

The $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred dihydroxyaromatic compound is bisphenol A, in which Y is isopropylidene and $A^1$ and $A^2$ are each p-phenylene.

Also employed in the method of this invention is at least one carbonate-terminated polydiorganosiloxane free from Si—O—C linkages (hereinafter sometimes simply "silicone"), which are unstable when heated in the presence of the basic materials employed as catalysts in melt polycarbonate formation. In general, the silicones may be represented by the formula

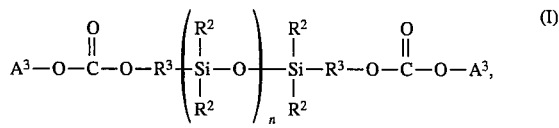

wherein $A^3$ is an aromatic radical and preferably phenyl, $R^2$ is a $C_{1-4}$ alkyl radical or phenyl and preferably methyl, $R^3$ is a divalent organic radical and n is from 0 to about 100. Suitable $R^3$ radicals include, for example, the trimethylene and 4-trimethylenephenylene radicals and, preferably, the 2-methoxy-4-trimethylenephenylene radical derived from eugenol (i.e., 2-methoxy-4-allylphenol) and having the formula

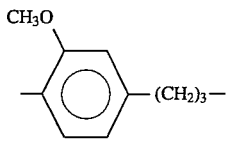

with $A^3$—O attached to the benzene ring.

The carbonate-terminated silicone may be prepared by a two-step method. The first step is the hydrosilylation of an olefinic hydroxy compound such as allyl alcohol, 2-allylphenol, 4-allylphenol or eugenol with a polydiorganosiloxane containing terminal Si—H groups. The hydrosilylation is generally conducted in an organic solvent such as toluene and at a temperature in the range of about 50°–150° C., and employs a platinum group hydrosilylation catalyst.

By "platinum group" is meant the portion of Group VIII of the Periodic Table, as traditionally identified, containing the metals rhodium, ruthenium, palladium, osmium, iridium and platinum. The preferred metals from this group are rhodium, palladium and platinum, with platinum being particularly preferred because of its relative availability and particular suitability.

Numerous types of platinum hydrosilylation catalysts are known in the art. They include, for example, reaction products of chloroplatinic acid with olefins, alcohols, ethers, aldehydes and vinylsiloxanes such as tetramethyldivinyldisiloxane. A reaction product of chloroplatinic acid with tetramethyldivinyldisiloxane in the presence of sodium bicarbonate as disclosed in U.S. Pat. No. 3,775,452, dissolved in xylene to a level of about 5% by weight platinum, is often preferred; it is hereinafter designated "Karstedt's catalyst".

If the hydrosilylating polydiorganosiloxane is a low molecular weight compound such as tetramethyldisiloxane, the molecular weight of the hydrosilylation product may be increased by conventional equilibration with a suitable cyclic polydiorganosiloxane, such as hexamethylcyclotrisiloxane or octamethylcyclotetrasiloxane.

Aryl carbonate termination of the hydrosilylation product may be achieved by reaction with a diaryl carbonate, usually diphenyl carbonate, or an aryl chloroformate. Capping with a diaryl carbonate is usually by a melt method whose conditions are similar to those of the melt copolysiloxanecarbonate reaction described hereinafter. Capping with a chloroformate is usually achieved under interfacial or solution conditions, typically in a methylene chloride-water mixture and in the presence of a base and/or acid acceptor such as triethylamine or sodium hydride, employing reaction conditions of the type conventionally used in interfacial polycarbonate formation.

The preparation of the carbonate-terminated silicones is illustrated by the following examples.

EXAMPLE 1

A 2-liter, 3-necked flask fitted with a nitrogen inlet, condenser, thermometer and magnetic stirrer was purged with nitrogen and charged with 372.8 g (2.27 moles) of eugenol, 152.49 g (1.135 moles) of tetramethyldisiloxane and 750 mL of toluene. Upon addition of 1.6028 g of Karstedt's catalyst with stirring, an exothermic reaction occurred which caused a rise in temperature to 72° over 4 minutes. The mixture was slowly heated to reflux temperature and maintained at that temperature for 1 hour, whereupon a vigorous exotherm occurred and the mixture had to be cooled quickly. After the reaction had subsided, refluxing was continued for ½ hour and the toluene was removed by distillation at atmospheric pressure. The low molecular weight hydrosilylation product was distilled at reduced pressure and collected at 230° C./0.01 torr. The yield was 422.2 g, or 80% of theoretical.

A dry 2-liter flask was charged with 150 g (0.325 mole) of the hydrosilylation product, 1329 g (17.9 moles) of octamethylcyclotetrasiloxane and 15 g of an acidic clay as catalyst, and the mixture was heated to 120° C. overnight, with stirring. It was then cooled and 10 g of a filter aid material was added, after which the mixture was filtered and unreacted octamethylcyclotetrasiloxane was removed by vacuum stripping. The product was a 3-methoxy-4-hydroxyphenyl-terminated silicone having an average block length of 56 units.

EXAMPLE 2

A 1-liter glass melt polymerization reactor was charged with 274 g (6.58 mmol) of a 3-methoxy-4-hydroxyphenyl-terminated silicone similar to that of Example 1 but having a block length of 50 units and 31 g (144.8 mmol) of diphenyl carbonate. A helixing stirrer was suspended in the solid mixture and the vessel was evacuated and purged with nitrogen three times. It was then immersed in a heat bath at 180° C. and stirring was initiated, whereupon a homogeneous liquid was formed. After equilibration, tetramethylammonium hydroxide, 0.3 mmol, was added and the temperature was raised to 180° C. for 5 minutes. The temperature was then raised to 210° C. and the pressure lowered to 175 torr, whereupon phenol began to distill from the reactor. After 35 minutes, the pressure was lowered to 100 torr and distillation of phenol was continued. After the theoretical amount (about 13 mL) of phenol had been collected, the reaction was stopped and the phenyl carbonate-capped silicone collected.

EXAMPLE 3

A 5-liter 3-necked flask fitted with a thermometer, pressure equalizing addition funnel, stirrer and nitrogen bubbler was purged with nitrogen and charged with 800 g (190.5 mmol) of the 3-methoxy-4-hydroxyphenyl-terminated silicone employed in Example 2, 2 liters of methylene chloride and 61 mL (438.1 mmol) of anhydrous triethylamine. The mixture was cooled to 4° C. in an ice-water bath and stirred as a solution of 68.5 g (438.1 mmol) of phenyl chloroformate in 200 mL of methylene chloride was added slowly to maintain the temperature at 10°–15° C. The total addition time was 3–4 hours, during which triethylamine hydrochloride precipitated.

When addition was complete, the mixture was allowed to warm to room temperature overnight and filtered. The filtrate was washed twice with water, dried over anhydrous magnesium sulfate, filtered and vacuum stripped, yielding the desired phenyl carbonate-capped silicone in a yield of greater than 98%.

EXAMPLE 4

A 5-liter 3-necked flask fitted as described in Example 3 was purged with nitrogen and charged with 400 g (96.1 mmol) of the 3-methoxy-4-hydroxyphenyl-terminated silicone employed in Example 2 and 3 liters of tetrahydrofuran. The mixture was stirred and cooled to 4° C. in an ice-water bath, whereupon 6 g of sodium hydride in the form of a 50% dispersion in oil (about 250 mmol) was added. Stirring was continued for 45 minutes after addition was complete, and then a solution of 31.2 g (199.3 mmol) of phenyl chloroformate in 300 mL of tetrahydrofuran was added slowly to maintain the temperature below 10° C. Total addition time was 2–3 hours.

The mixture was allowed to warm to room temperature overnight and filtered through a filter aid material. Ethyl ether, 250 mL, was added and the solution was washed twice with saturated aqueous sodium chloride solution and dried over anhydrous magnesium sulfate. It was then filtered and filtrate stripped in vacuum to yield the desired phenyl carbonate-terminated silicone in a yield of 357.6 g (84.4% of theoretical).

The diaryl carbonates employed in the method of the invention include diphenyl carbonate and substituted derivatives thereof. Diphenyl carbonate is usually preferred by reason of its particular suitability and relatively low cost.

Also employed is a carbonate transesterification catalyst. Many such catalysts are known in the art and are enumerated in patents and publications dealing with melt polycarbonate formation, including U.S. Pat. Nos. 4,316,981, 4,345,062, 4,363,905 and 5,319,066 which are incorporated by reference herein.

For the most part, the carbonate transesterification catalysts are basic materials. They include elemental alkali metals and alkaline earth metals, alkaline earth metal hydroxides, salts of strong bases and weak organic acids, amines, quaternary ammonium and phosphonium salts, tertiary sulfonium compounds, pyridines containing electron-releasing substituents such as amino or hydroxy groups, metal aluminum hydrides and borohydrides and bicyclic guanidine compounds. The tetraalkylammonium carboxylates are often preferred with tetramethylammonium formate being most preferred, generally employed in combination with an alkali metal hydroxide and preferably sodium hydroxide. Phase transfer catalysts may be employed as replacements for and/or supplements to said basic materials.

The method of this invention is performed by merely heating the above-described reagents in the melt, preferably in an inert atmosphere such as nitrogen. Heating is usually in two stages. In the first stage, temperatures are initially up to about 200° C. and are gradually increased to a maximum of about 280° C., generally with a gradual decrease in pressure so that phenol or an analogous hydroxyaromatic compound distills out of the mixture. During this stage, oligomeric copolysiloxanecarbonates are formed. In the second stage, at temperatures of at least about 280° C. but below the decomposition temperature of the product copolysiloxanecarbonate and preferably in the range of about 300°–325° C. and at reduced pressure (e.g., in the range of about 0.5–10.0 torr), the oligomeric material condenses to form high molecular weight block copolysiloxanecarbonate.

The proportions of carbonate-terminated silicone and bisphenol may be varied widely, according to the block proportions desired in the product. In general, the carbonate-terminated silicone comprises about 0.5–95%, preferably about 1–40% and most preferably about 3–20%, by weight based on total carbonate-terminated silicone and bisphenol. Alternatively, a block copolysiloxanecarbonate with a relatively high proportion of siloxane units, on the order of 40–80% by weight, may be prepared and "blended down" with homopolycarbonate to afford a polymer mixture having the desired proportion of siloxane groups for the end use intended.

The amount of diaryl carbonate employed is generally at least an equimolar proportion with respect to the bisphenol. It is within the scope of the invention to employ an excess, typically up to a 2:1, preferably up to a 1.1:1 and most preferably a 1.015–1.08:1 molar ratio, of diaryl carbonate to bisphenol. Catalyst proportions are generally about 0.001–1.0 mole percent, preferably about 0.05–0.25 mole percent, based on bisphenol, of which alkali metal hydroxide (if present) constitutes about 10–20 ppm based on total catalyst.

The method of this invention is illustrated by the following examples. All percentages are by weight.

EXAMPLES 5–8

Mixtures of various proportions of bisphenol A, a carbonate-terminated silicone of the type prepared in Examples 2–4 and diphenyl carbonate were prepared in a 1-L glass melt polymerization reactor which had previously been passivated by acid washing, rinsing and drying at 70° C. overnight. A helixing stirrer was suspended in the mixture and the reactor was sealed, deoxygenated by evacuation and charged with purified nitrogen, with the deoxygenation-charging procedure being repeated three times. The reactor was then heated to 180° C. and stirred slowly. Upon complete liquefaction, the milky white solution was allowed to equilibrate for 5–10 minutes and then stirred at 250 rpm as catalytic amounts of a 2.21M aqueous solution of tetramethylammonium formate and a 0.025M aqueous solution of sodium hydroxide were added.

Heating was continued, with evacuation and distillation of by-product phenol, according to the following regime with minor variations from example to example:

180°/760 torr—5 minutes;

210°/180 torr—35 minutes;

210°/100 torr—35 minutes;

240°/15 torr—30 minutes;

270°/2 torr—30 minutes;

300°/2 torr—10 minutes or more, to achieve molecular weight build.

During the last few minutes of heating, the agitator speed was decreased periodically to avoid excessive system torque during molecular weight build of the polymer.

The products were the desired copolysiloxanecarbonates, which (at least in Examples 6–8) demonstrated no phase separation upon dissolution in chloroform. Details of preparation and properties are listed in the following table.

| | Example | | | |
|---|---|---|---|---|
| | 5 | 6 | 7 | 8 |
| Bisphenol A: | | | | |
| Grams | 22.5 | 82.7 | 107.9 | 200 |
| Mmol | 98.4 | 360 | 472.6 | 876 |
| Silicone, grams | 100 | 54.9 | 30.2 | 10.9 |
| Diphenyl carbonate | | | | |
| Grams | 27.7 | 141.5 | 131.8 | 225.2 |
| Mmol | 127.9 | 660 | 615.3 | 1051 |
| Tetramethylammonium formate, mmol | 0.23 | 0.45 | 0.45 | 0.45 |
| Sodium hydroxide, μmol | 3.75 | 7.5 | 7.5 | 3.75 |
| Silicone incorporation | | | | |
| Theoretical, % | 80 | 40 | 20 | 5 |
| Actual, % | 60 | 34.5 | 19.8 | 4.5 |
| Actual, % of theoretical | 75 | 86.3 | 99 | 90 |
| Mw** | *** | 62,500 | 57,900 | 43,000 |
| Mn** | *** | 31,900 | 18,600 | 14,500 |
| Tg, °C. | −35 | 42 | 119 | — |
| Intrinsic viscosity, dl/g* | — | — | — | 0.434 |

*In chloroform at 25° C.
**By gel permeation chromatography relative to polystyrene.
***Gelled; no molecular weight determinable.

Corresponding products prepared from hydroxy-terminated silicone showed incorporation of only about 3–5% by weight of theoretical polydimethylsiloxane units. In addition, they formed 2-phase systems upon dissolution in chloroform. Attempts to make copolysiloxanecarbonates by similar procedures employing octamethylcyclotetrasiloxane and unfunctionalized polydimethylsiloxane oil yielded suspensions showing no evidence of copolymer formation.

EXAMPLE 9

The product of Example 7 was blended in a Henschel mixer with bisphenol A homopolycarbonate to produce a blend containing 5% silicone groups, and the blend was injection molded into tensile strength test bars. Said bars had a Tg of 139.4° C., a weight average molecular weight of 54,600, a number average molecular weight of 20,600 and an intrinsic viscosity of 0.454 g/dl. They exhibited V-O flame retardant properties.

What is claimed is:

1. A method for preparing a block cosiloxanecarbonate which comprises heating in the melt in the presence of a carbonate transesterification catalyst, a mixture of at least one dihydroxyaromatic compound, at least one carbonate-terminated mono- or polydiorganosiloxane free from Si—O—C linkages and at least one diaryl carbonate; said heating being in two stages, the first being from an initial temperature up to about 200° C. to a maximum of about 280° C. and the second being at least 280° C. but below the decomposition temperature of said cosiloxanecarbonate.

2. A method according to claim 1 wherein a carbonate-terminated polydiorganosiloxane is employed.

3. A method according to claim 2 wherein the carbonate-terminated polydiorgansiloxane is a polydimethysiloxane.

4. A method according to claim 3 wherein the dihydroxyaromatic compound has the formula HO—A$^1$—Y—A$^2$—OH, wherein each of A$^1$ and A$^2$ is a monocyclic divalent aromatic radical and Y is a bridging radical in which one or two atoms separate A$^1$ from A$^2$.

5. A method according to claim 4 wherein the dihydroxyaromatic compound is bisphenol A.

6. A method according to claim 4 wherein the carbonate-terminated polydimethysiloxane has the formula

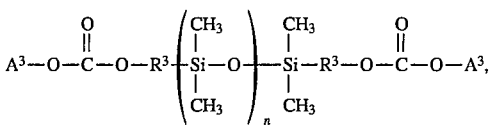

wherein A$^3$ is an aromatic radical, R$^3$ is a divalent organic radical and n is from 1 to about 100.

7. A method according to claim 6 wherein A$^3$ in phenyl.

8. A method according to claim 7 wherein R$^3$ is

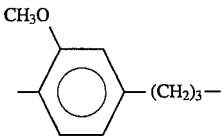

with A$^3$—OCOO attached to the benzene ring.

9. A method according to claim 4 wherein the carbonate transesterification catalyst is a tetraalkylammonium carboxylate.

10. A method according to claim 4 wherein the carbonate transesterification catalyst is a combination of tetraalkylammonium carboxylate and alkali metal hydroxide.

11. A method according to claim 10 wherein the carbonate transesterification catalyst is a combination of tetramethylammonium formate and sodium hydroxide.

12. A method according to claim 11 wherein the dihydroxyaromatic compound is bisphenol A.

13. A method according to claim 12 wherein the carbonate-terminated polydimethylsiloxane has the formula

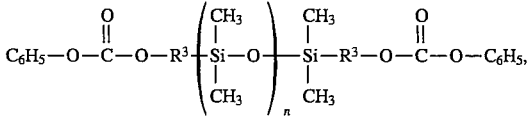

wherein R$^3$ is a divalent organic radical and n is from 0 to about 100.

14. A method according to claim 12 wherein R$^3$ is

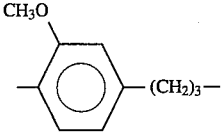

with C$_6$H$_5$OCOO attached to the benzene ring.

15. A method according to claim 4 wherein the carbonate-terminated polydimethylsiloxane comprises about 0.5–95% by weight based on the total of said polydimethylsiloxane and dihydroxyaromatic compound.

16. A method according to claim 15 wherein the carbonate-terminated polydimethylsiloxane comprises about 1–40% by weight based on the total of said polydimethylsiloxane and dihydroxyaromatic compound.

17. A method according to claim 15 wherein the carbonate-terminated polydimethylsiloxane comprises about 3–20% by weight based on the total of said polydimethylsiloxane and dihydroxyaromatic compound.

18. A method according to claim 4 wherein the molar ratio of diaryl carbonate to dihydroxyaromatic compound is about 1–2:1.

* * * * *